Dec. 5, 1933.　　　　G. FISLER　　　　1,937,882
ELECTRIC COMB
Filed June 6, 1932
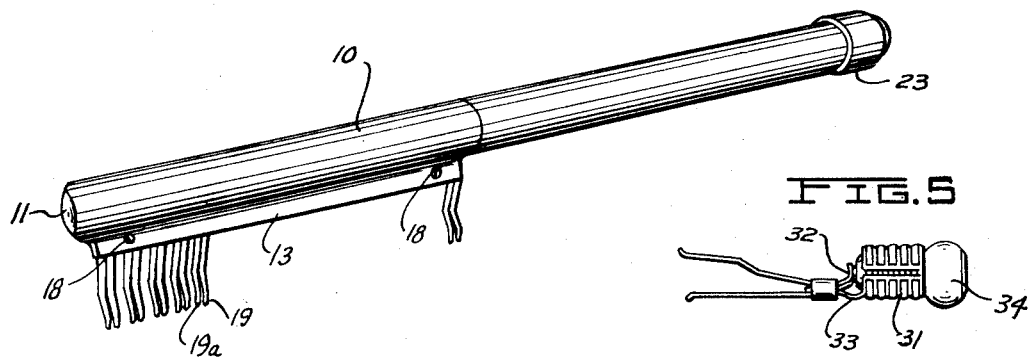
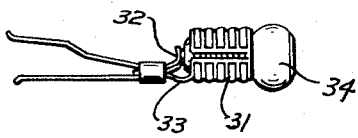
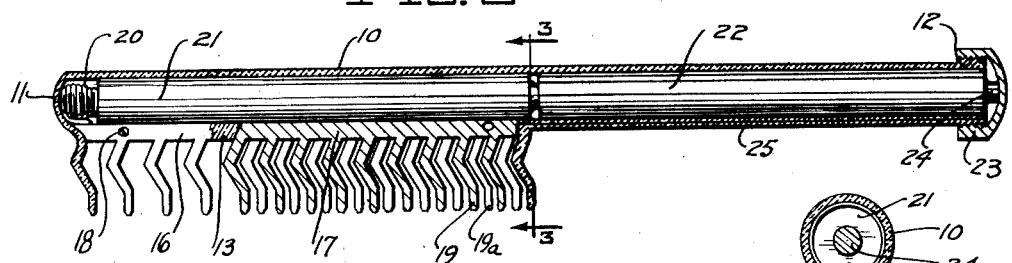
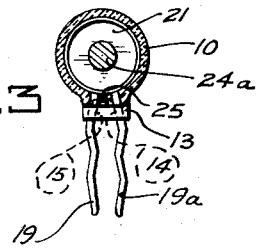
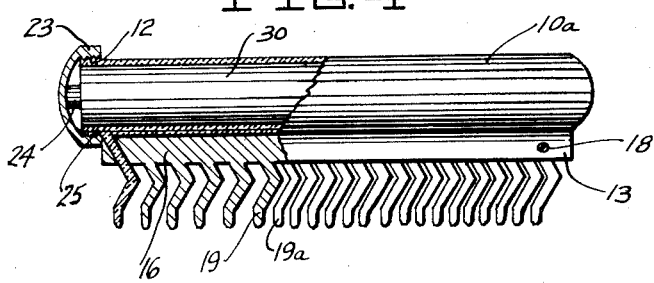
INVENTOR
GOTTFRIED FISLER
BY
ATTORNEY Patented Dec. 5, 1933

1,937,882

UNITED STATES PATENT OFFICE 1,937,882

ELECTRIC COMB

Gottfried Fisler, Cleveland, Ohio

Application June 6, 1932. Serial No. 615,540

2 Claims. (Cl. 219—21)

My invention relates to combs and especially electric combs, battery operated.

One object of my invention is to provide a means whereby a slight current of electricity may permeate the hair.

Other objects may be noted from the following specification and the accompanying drawing, in which:

Figure 1 is a perspective view of the comb with a handle; Fig. 2 is a longitudinal section of the same; Fig. 3 is a transverse section taken on lines 3—3 of Fig. 2; Fig. 4 is a pocket comb without a handle, partly in section; Fig. 5 is a side view of a bulb battery tester.

Referring to the drawing, 10 is a hollow insulating casing slightly convex at the outer end 11 and threaded at the other end 12, said casing having a rib or flange 13, with spaced grooves 14 and 15 within which are mounted conducting plates 16 and 17, and bolted to the flange 13 by bolts 18.

The conducting plates 16 and 17 have teeth 19 and 19a projecting from the grooves 14 and 15, which may be of the shape shown in the drawing.

A coil contact spring 20 in the convex end 11 of the hollow casing 10 is compressed by batteries 21 and 22 with contact points 24a and 24 respectively, when the contact cap 23 is screwed on the threaded end 12 of said hollow casing 10; contact point 24 of battery 22 pressing against the contact cap 23 closes the circuit. A conducting wire 25, indicated by the solid line in Figs. 2 and 4, is mounted within the handle portion of the casing and preferably embedded in the material of which the casing is formed, as illustrated. This conducting wire extends through the rearmost comb tooth and contacts with the plate 15 and with the cap 23 and forms an electrical connection between one pole of the battery and the plate 15.

The end of contact spring 20 is attached to the inner wall of the convex end 11 of the insulated casing 10 and contacts the conducting plate 16, thus as the comb is drawn through the hair the circuit is closed between the two sets of teeth 19 and 19a.

The modification shown in Fig. 4 is of the same construction except that the hollow casing 10a contains only one battery 30.

The bulb battery tester consists of a threaded metal casing 31 with contact springs 32 and 33 and bulb 34 screwed within said threaded casing to contact spring 32. This tester is placed with contact springs 32 and 33 against teeth 19 and 19a, which lights bulb 34 if the battery or batteries are contacting properly.

By the connections described, the teeth 19 and 19a are electrically connected to opposite poles of the battery and when the comb is drawn through the hair the circuit is closed through the hair or the moisture thereon so that the current can flow therethrough from one set of comb teeth to the other.

I claim:—

1. An electrical comb, comprising an elongated tubular body of insulating material, a removable battery therein, a longitudinal external rib integral with said body, parallel longitudinal grooves on the outer surface of the body disposed one on each side of said rib, metallic comb tooth elements disposed one in each groove and insertable therein edgewise, said elements being spaced laterally on opposite sides of said rib, means to secure said elements in fixed position in said grooves, a conductor embedded in the body wall and electrically connected to one of said comb tooth elements and to one terminal of the battery, and means disposed interiorly of the casing and connecting the other comb tooth element to the other terminal of the battery.

2. An electrical comb comprising an elongated tubular body of insulating material, a longitudinal external rib integral with said body and extending part way therealong, parallel longitudinal grooves on the outer surface of the body disposed one on each side of said rib and coextensive therewith, metallic comb tooth elements disposed one in each groove, said elements being spaced laterally on opposite sides of said rib, means to secure said elements in place whereby a comb having a tooth head portion and a handle portion is provided, batteries arranged in said head portion and in said handle portion in end to end abutting relation and electrically connected through said abutting ends with each other, a conductor embedded in the handle portion of the body wall and electrically connected to one of said comb tooth elements and to one terminal of one of said batteries and means disposed interiorly of the said casing for connecting the other comb tooth element to the opposite terminal of another of said batteries.

GOTTFRIED FISLER.